(12) United States Patent
Zhou et al.

(10) Patent No.: US 10,728,446 B2
(45) Date of Patent: Jul. 28, 2020

(54) METHOD AND APPARATUS FOR PERFORMING PROCESSING IN A CAMERA

(71) Applicant: Advanced Micro Devices, Inc., Sunnyvale, CA (US)

(72) Inventors: Hui Zhou, Shanghai (CN); Allen H. Rush, Sunnyvale, CA (US); Yang Ling, Shanghai (CN); Jiangli Ye, Shanghai (CN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 26 days.

(21) Appl. No.: 15/816,537

(22) Filed: Nov. 17, 2017

(65) Prior Publication Data

US 2019/0141238 A1 May 9, 2019

(30) Foreign Application Priority Data

Nov. 8, 2017 (CN) .......................... 2017 1 1090962

(51) Int. Cl.
*H04N 5/232* (2006.01)
*H04N 5/33* (2006.01)
*H04N 5/265* (2006.01)
*H04N 9/04* (2006.01)

(52) U.S. Cl.
CPC ......... *H04N 5/23229* (2013.01); *H04N 5/265* (2013.01); *H04N 5/332* (2013.01); *H04N 9/04515* (2018.08); *H04N 9/04553* (2018.08)

(58) Field of Classification Search
CPC ...... H04N 5/332; H04N 9/045; H04N 1/6008; H04N 1/40068; H04N 1/60; G06T 5/002; G06T 3/4015; G06T 5/50
See application file for complete search history.

(56) References Cited

U.S. PATENT DOCUMENTS

| | | | |
|---|---|---|---|
| 8,917,327 B1 * | 12/2014 | Bishay | H04N 9/045 348/219.1 |
| 2007/0145273 A1 | 6/2007 | Chang | |
| 2008/0315104 A1 | 12/2008 | Nam | |
| 2012/0287286 A1 * | 11/2012 | Nomura | G06T 3/4038 348/162 |
| 2013/0278726 A1 * | 10/2013 | Muhammad | H04N 9/045 348/46 |
| 2014/0340515 A1 * | 11/2014 | Tanaka | G06T 5/003 348/143 |
| 2016/0019421 A1 * | 1/2016 | Feng | G06K 9/00604 382/117 |
| 2016/0080706 A1 * | 3/2016 | Kaiser | H04N 5/332 |
| 2016/0255290 A1 | 9/2016 | Wajs et al. | |
| 2017/0064275 A1 | 3/2017 | Chen et al. | |
| 2017/0186133 A1 * | 6/2017 | Kunze | G06T 3/4015 |
| 2017/0205886 A1 * | 7/2017 | Wan | G06F 3/011 |
| 2017/0374299 A1 * | 12/2017 | Liu | H04N 5/332 |

* cited by examiner

*Primary Examiner* — Neil R Mikeska

(74) *Attorney, Agent, or Firm* — Volpe and Koenig, P.C.

(57) ABSTRACT

A method and apparatus of performing processing in an image capturing device includes receiving an image by the image capturing device. The image is filtered to generate a first visible light component and a second infrared component. A decontamination is performed on the infrared component to generate a decontaminated infrared component, and an interpolation is performed on the visible component to generate an interpolated visible component, both of which are provided to an image signal processor (ISP) for further processing.

37 Claims, 6 Drawing Sheets

100

500A

| B | G | B | G |
|---|---|---|---|
| IR | R | IR | R |
| B | G | B | G |
| IR | R | IR | R |

| B | G | B | G |
|---|---|---|---|
| G | R | G | R |
| B | G | B | G |
| G | R | G | R |

FIG. 5B

METHOD AND APPARATUS FOR PERFORMING PROCESSING IN A CAMERA

CROSS REFERENCE TO RELATED APPLICATION

This application claims priority to Chinese Patent Application No. 201711090962.0, filed Nov. 8, 2017, the entire contents of which is hereby incorporated by reference as if fully set forth herein.

BACKGROUND

In order to capture infrared (IR) images with a camera, an IR filter and sensor is often implemented along with a visible light (red/green/blue "RGB") filter and sensor that captures visible light images. The use of a dual band RGBIR filter allows a single camera to be utilized to capture both visible light images and IR images. By using a single camera, size and cost can be saved, as well as avoiding the need to do a geometry calibration that is required when two cameras are utilized.

However, the colors resident in the visible image can be contaminated by the IR energy passing through the IR band of the dual band filter, since RGB pixels also have a spectral response in the IR band. Additionally, the IR image can be contaminated by the visible light energy in a similar manner.

Accordingly, in a camera that has a dual band RGBIR filter, conventional techniques for acquiring a quality RGB image employ a unique image signal processor (ISP), since the pattern of a pixel array on an RGBIR sensor is different than that of a conventional RGB sensor, which produces a conventional RGB "Bayer" pattern. Using an RGBIR sensor, some pixels of a conventional Bayer pattern are replaced by IR pixels. A conventional ISP is not able to perform conventional processing on the resulting image that it receives from an RGBIR sensor.

BRIEF DESCRIPTION OF THE DRAWINGS

A more detailed understanding can be had from the following description, given by way of example in conjunction with the accompanying drawings.

FIG. 5A shows an example RGBIR pattern including IR contamination; and

FIG. 5B shows an example interpolated Bayer pattern with IR contamination removed.

DETAILED DESCRIPTION

Figure 1:
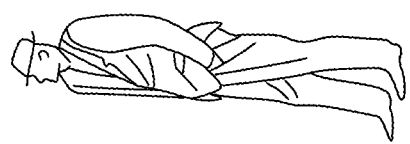
FIG. 1 is a block diagram of an example system in which one or more disclosed embodiments may be implemented.
Figure 1:
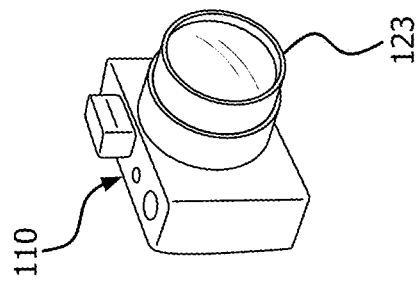

Although a more detailed description follows, briefly a method and apparatus is described herein for receiving and processing an image that includes a visible light (red/green/blue "RGB") component and an infrared (IR) component. The method allows a conventional image signal processor (ISP) to perform conventional processing an RGBIR signal with a decontamination function being performed on the signal as well as an interpolation (e.g., red, green, blue light interpolation) being performed on the signal. The contamination in the signal can be due to a number of factors.

For example, some contamination in a received signal may be due to spectral crosstalk which occurs because of imperfect color filters passing through some amount of unwanted light of the colors being filtered out. Optical spatial crosstalk contamination is due to color filters being located at some distance from an image pixel surface due to metal and insulation layers. The light coming at angles other than orthogonal passes through a filter and can partially be absorbed by the adjacent pixel being generated rather than one below. Depending on the f-number of the lens, this portion of the light absorbed by a neighboring pixel can vary significantly and can be big enough for low f-numbers. Micro-lenses located on the top of color filters can reduce this component of crosstalk significantly when appropriate form of micro-lenses and optimum position of them are chosen. Electrical crosstalk contamination results from photo-generated carriers having the possibility to move to neighboring charge accumulation sites. Electrical crosstalk occurs in both monochrome and color image sensors. The quantity of the carriers that can be accumulated by the neighboring pixel and the corresponding crosstalk depends on the pixel structure, collection area, and distribution of sensitivity inside a pixel. Accordingly, infrared light can contaminate the visible component of a received RGBIR image, and visible light can contaminate the infrared component of the received RGBIR image.

A method of performing processing in an image capturing device is disclosed. The method includes receiving an image by the image capturing device that includes an infrared component and a visible component. A decontamination is performed to generate a decontaminated infrared component and a decontaminated visible component. An interpolation is performed on the decontaminated visible component to generate an interpolated visible component, and the decontaminated infrared component and the decontaminated interpolated visible component are provided to an image signal processor (ISP) for further processing. An image capturing device is disclosed, The image capturing device includes a camera module, a processor operatively coupled to the camera module, and an image signal processor (ISP) operatively coupled with the processor. The camera module receives an image that includes an infrared component and a visible component and forwards the received image to the processor. The processor performs a decontamination to generate a decontaminated infrared component and a decontaminated visible component. The processor performs an interpolation on the decontaminated visible component to generate an interpolated visible component, and forwards the decontaminated infrared component and the decontaminated interpolated visible component to the ISP for further processing. A non-transitory computer readable medium having instructions recorded thereon, that when executed by a computing device, cause the computing device to perform operations is disclosed. The operations include receiving an image that includes an infrared component and a visible component. A decontamination is performed to generate a decontaminated infrared component and a decontaminated visible component. An interpolation is performed on the decontaminated visible component to generate an interpolated visible component, and the decontaminated infrared component and the decontaminated interpolated visible component are provided to an image signal processor (ISP)

for further processing. FIG. 1 is a block diagram of an example system 100 in which one or more disclosed embodiments may be implemented. The example system 100 includes an image capturing device, (e.g., camera), 110 that includes at least a lens 123 for capturing an image. For purposes of example, the image shown in FIG. 1 is a person. The image that is captured by the lens 123 includes both visible (RGB) light and IR light. It should be noted that additional types of light can be captured by the lens 123, but for purposes of example, visible and IR are discussed herein.

Figure 2A:
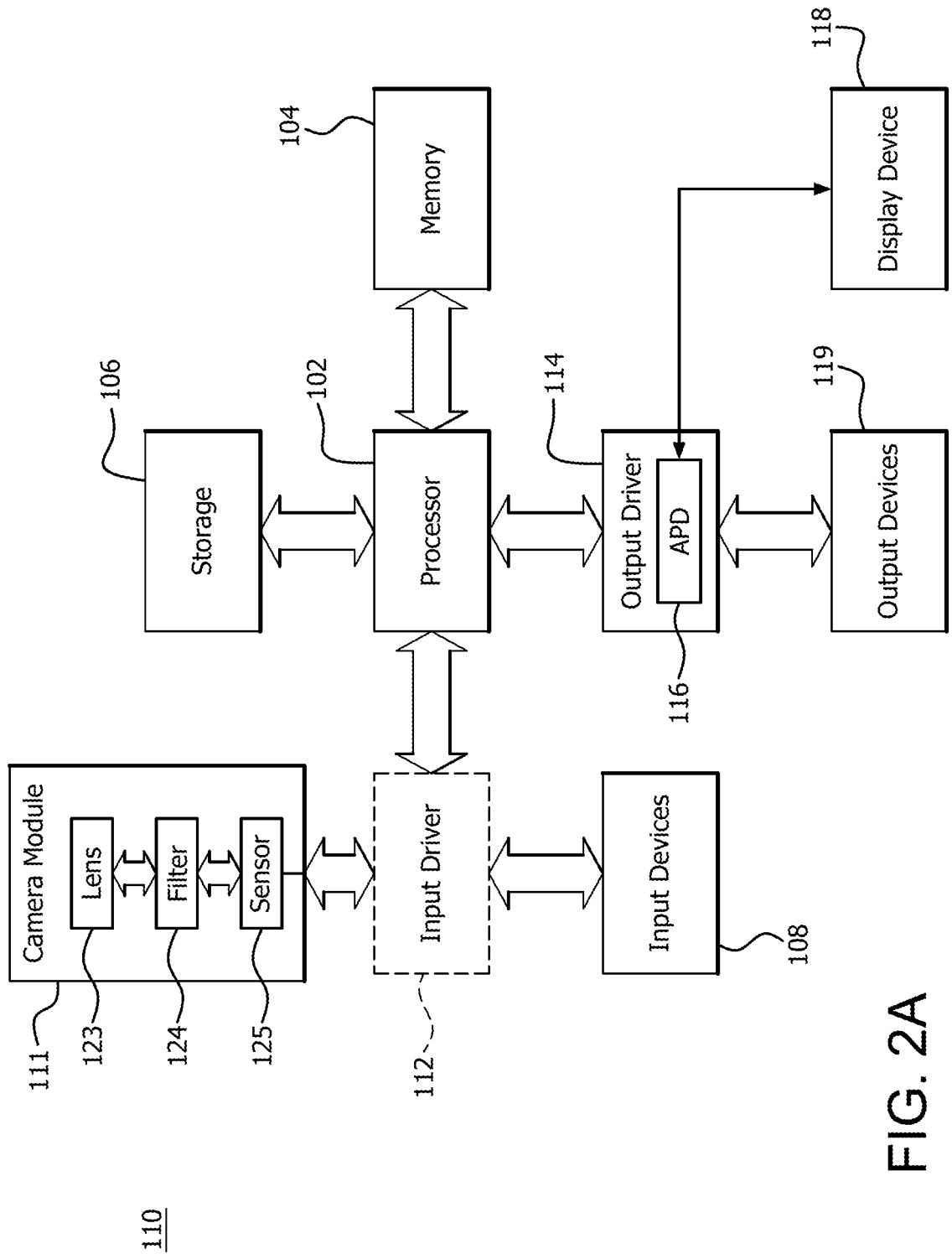
FIG. 2A is a block diagram of an example device depicted in FIG. 1 in which one or more features of the disclosure can be implemented.

FIG. 2A is a block diagram of one of the example devices 110 depicted in FIG. 1 in which one or more features of the disclosure can be implemented. More detail regarding the implementation of a method of seam finding as it relates to FIG. 2 is described in further detail below. Although the device 110 has been described as an image capturing device, (e.g., camera), it is noted that the device 110 can include, for example, a computer, a gaming device, a handheld device, a set-top box, a television, a mobile phone, or a tablet computer. For purposes of example herein, the example device 110 is described as an image capturing device 110, which for example is a camera.

Accordingly, the device 110 includes a processor 102, a memory 104, a storage 106, one or more input devices 108, a camera module 111, and one or more output devices 119. The device 110 can also optionally include an input driver 112 and an output driver 114. It is understood that the device 110 can include additional components not shown in FIG. 2A.

The camera module 111 includes the lens 123 described above, a filter 124, and a sensor 125. The filter 124 and sensor 125 are a RGBIR filter/sensor pair that perform filtering for the RGB and IR light bands and generation of an RGBIR pattern, described in more detail below.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache. A conventional image signal processor (ISP) can be included in the processor 102 to perform RGBIR/Bayer image signal processing described in more detail below. Alternatively, the ISP can be included in the APD 116 or as a separate processing unit (not shown). That is, although the location of the conventional ISP is not specifically shown, it can reside separately from, or be integrated within the processor 102 or APD 116. The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 119 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 the input devices 108, and the lens 111, and permits the processor 102 to receive input from the input devices 108 and the lens 111. The output driver 114 communicates with the processor 102 and the output devices 110, and permits the processor 102 to send output to the output devices 119. It is noted that the input driver 112 and the output driver 114 are optional components, and that the device 110 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein. The image signal processing described herein can also be performed by the APD 116.

Figure 2B:
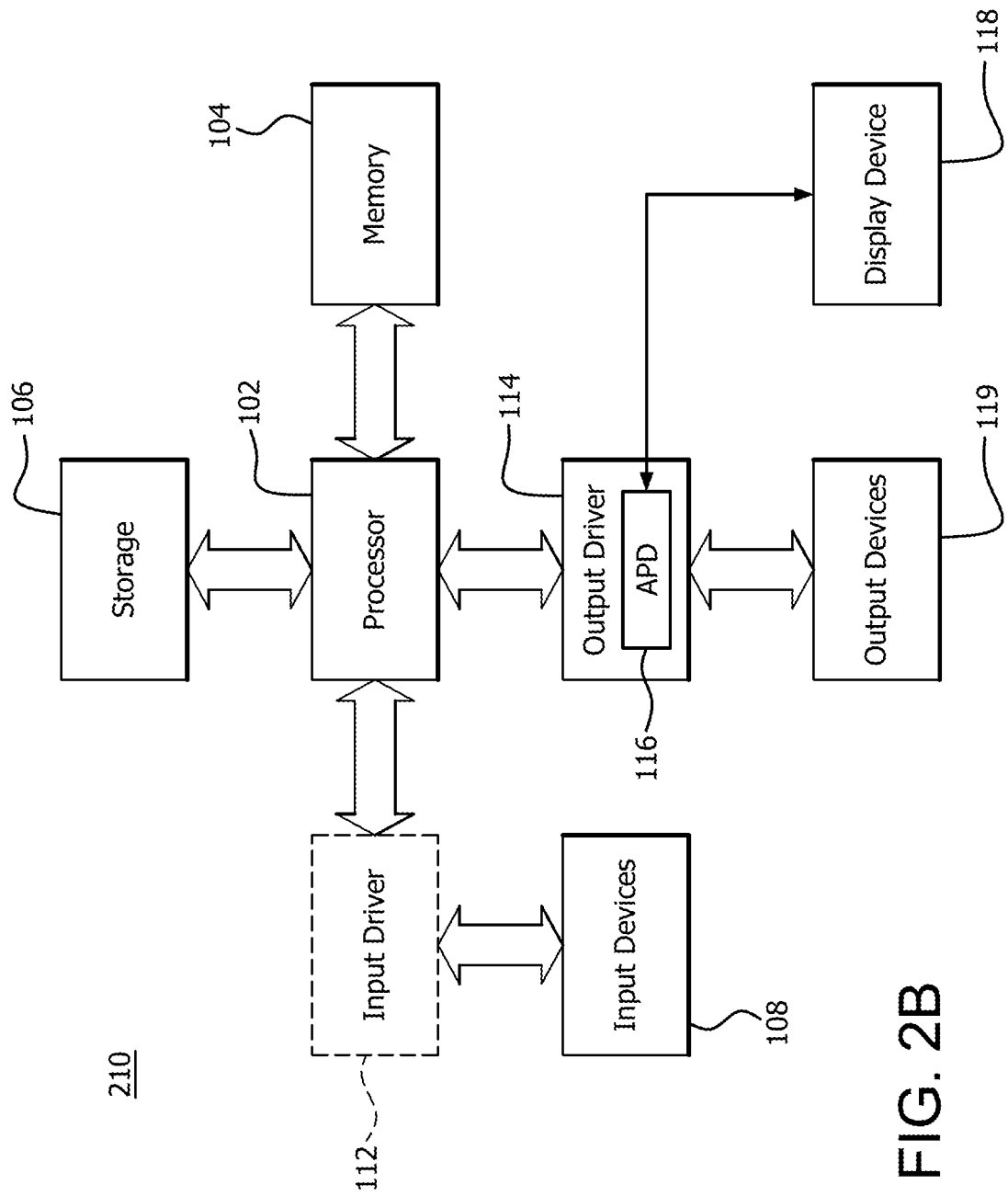
FIG. 2B is a block diagram of an example system in which one or more features of the disclosure can be implemented.

FIG. 2B is a block diagram of an example system 210 in which one or more features of the disclosure can be implemented. The system 210 includes substantially similar components to the device 110, except for the camera module 111. The system 210 can include, for example, a computer, a gaming device, a handheld device, a set-top box, a television, a mobile phone, or a tablet computer. The system 210 can be in communication with the device 110 depicted in FIG. 1 and can provide control programming to the device 110 and receive data from the device 110.

Figure 3:
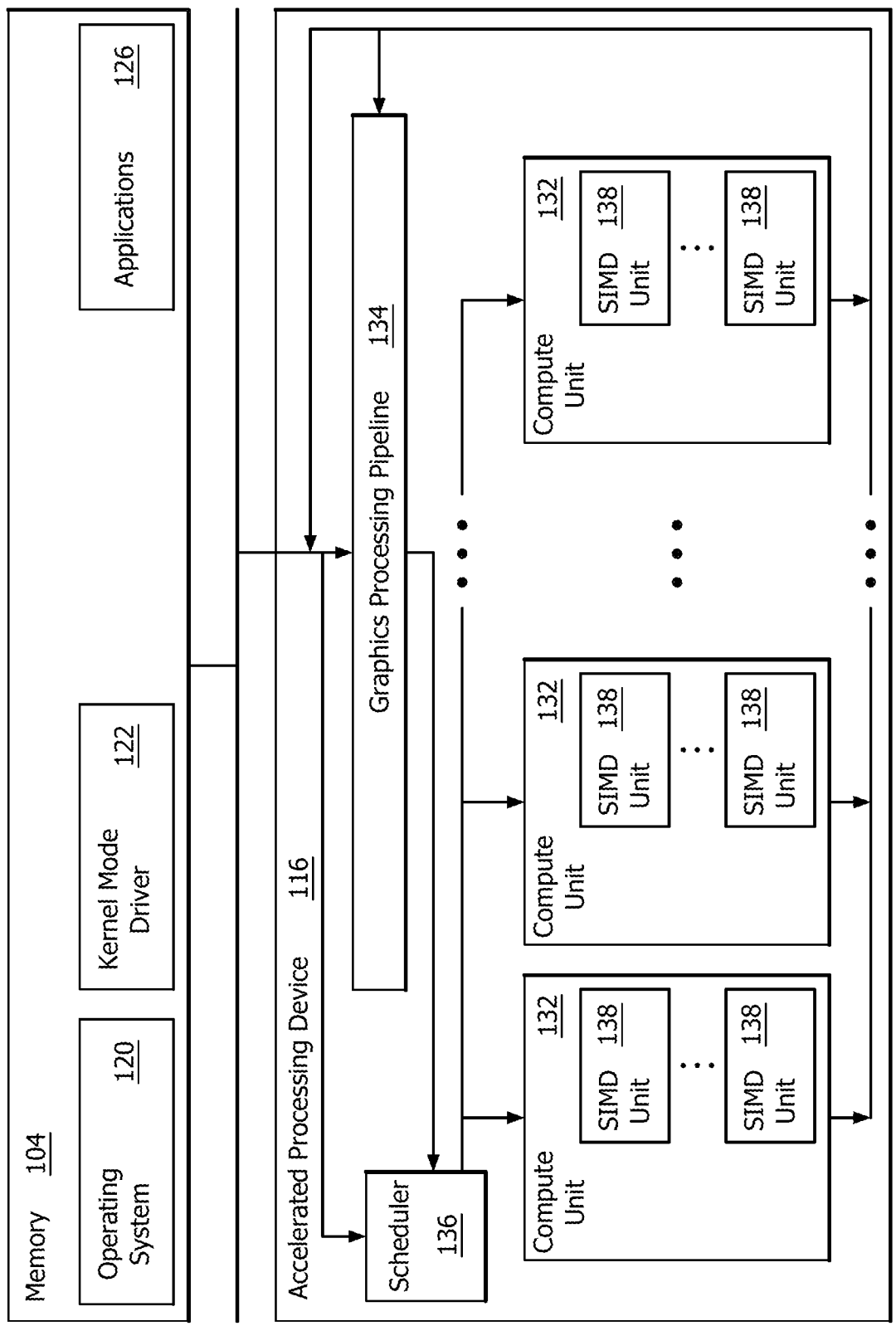
FIG. 3 is a block diagram of the example device of FIG. 2A and example system of FIG. 2B, illustrating additional detail.

FIG. 3 is a block diagram of the device 110 and system 210, illustrating additional details related to execution of processing tasks on the APD 116. For example, the calibration, decontamination and interpolation operations described below can be performed where appropriate utilizing the parallel SIMD paradigm described herein. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution. For purposes of example, the method described herein, (e.g., the decontamination and the interpolation described below), can be performed by sending the instructions to the compute units 132 of the APD 116 for execution.

Figure 4:
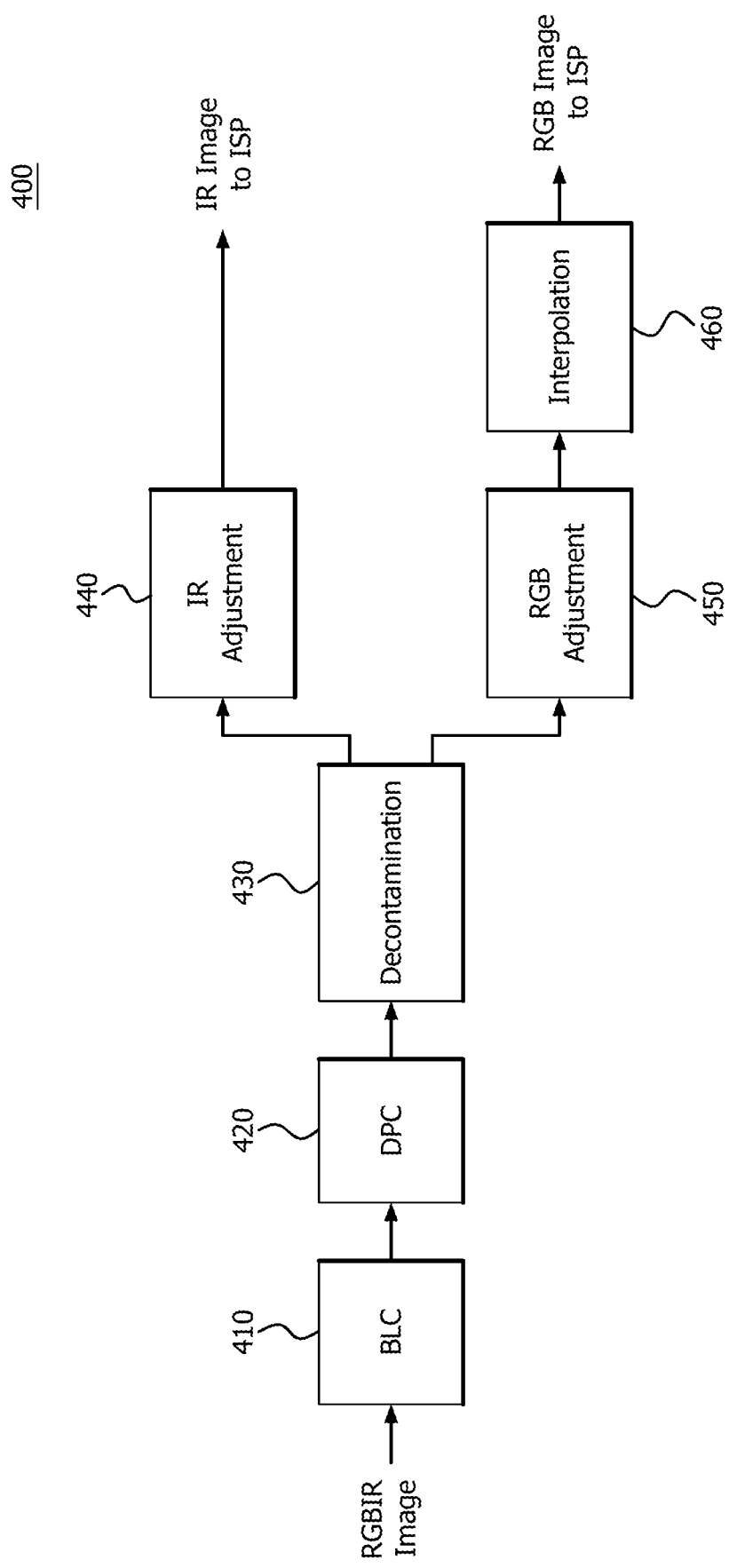
FIG. 4 is a flow diagram of an example method for performing processing in a camera.

FIG. 4 is a flow diagram of an example method 400 for performing processing in a camera. In step 410, a captured image that includes an RGB and IR component, (e.g., captured by camera 110) undergoes black level correction (BLC). BLC is a conventional process for removing the black level in the input RGBIR image. Once the BLC is performed in step 410, defect pixel correction (DPC) is performed on the received RGBIR image (step 420). The DPC operation is a conventional operation where a pixel is compared to surrounding pixels, and if the differences between the pixel and the surrounding pixels exceeds a pre-defined threshold or is below another pre-defined threshold, the pixel is replaced, (e.g., with a pixel that is derived from the average values of the surrounding pixels). These conventional operations, (e.g., steps 410 and 420), can be performed by the processor 102 or APD 116 described above.

Decontamination is then performed (step 430) to remove IR light energy from the visible component and RGB light energy from the infrared component. The decontamination operation can be performed by the processor 102 or the APD 116. For example, the RGBIR image is transferred into memory, (e.g., memory 104). The image is then fed back into the processor, (e.g., processor 102 or APD 116), to be decontaminated for the generation of a still image or video for output. The decontaminated image includes a separate visible component and an infrared component. The decontamination may be modeled in accordance with the following. By taking the vector $I=[R, G, B, IR]^T$ for an observed signal level, and the vector $I'=[\hat{R}, \hat{G}, \hat{B}, \widehat{IR}]^T$ for the ideal non-contaminated value, where T is the transpose of the matrix, R, G, B and IR are observed values from the RGBIR sensor, and where $\hat{R}, \hat{G}, \hat{B}$ and $\widehat{IR}$ are ideal non-contaminated values. The relationship between the observed and ideal non-contaminated value can characterized in advance, for example through the use of a calibration operation (described below), can be used to generate a matrix A to describe the relationship between observed and ideal non-contaminated values. The contamination model can therefore be described in accordance with the following equation:

$$I = A*I'. \quad \text{Equation (1)}$$

As described above, a calibration process can be performed prior to decontamination to determine a contamination factor that defines how much contamination exists in the received signal, (e.g., the contamination matrix A) based upon non-contaminated values. This calibration can be performed by generating one uniform test chart, which is a diffusor backlighted by narrow spectrum band light, (Red, Green, Blue or NIR), and capturing a series of raw images with an RGBIR camera, (e.g., image device 110), on the test chart. The raw data generated can be used to calculate the contamination factor for each channel, (e.g., R/G/B/IR), to form the matrix A for each pixel position.

Accordingly, matrix A is the contamination matrix representing the contamination that is applied to the ideal non-contaminated values to arrive at the observed, contaminated signal levels. The decontamination matrix is then computed as the inverse contamination matrix. That is:

$$I' = A^{-1}*I, \quad \text{Equation (2)}$$

where $A^{-1}$ is the inverse contamination matrix A, (i.e., decontamination matrix).

Once the decontamination matrix is determined, the values of the components in the matrix can be utilized to remove unwanted contamination, (e.g., RGB or IR energy), from the image to generate the decontaminated visible component and infrared component. However, because the decontamination step removes a portion of the energy from the decontaminated image, potentially producing some level of a distorted component, an adjustment can be performed on the resultant components to account for the energy loss. Therefore, once decontaminated in step 430, an IR adjustment is performed in step 440, as well as an RGB adjustment in step 450. The IR adjustment (step 440) is performed on the infrared component. Again, the adjustment operations, (e.g., steps 440 and 450), can be performed by the processor 102 or the APD 116. That is, an example 8 bit pixel has a value between 0-255. In a highlighted, or saturated area, the value will usually approach the upper boundary 255, therefore the energy removal by decontamination in such an area results in a highlight contour, (i.e., discontinuity), pattern. To counter this effect, the observed IR image is compared against a pre-defined threshold, and if the value is greater than the pre-defined threshold, the strength of decontamination is degraded gradually towards the upper boundary 255 so that the discontinuity will not happen. That is, less decontamination may be performed, or not performed at all. The threshold can be increased or decreased, (e.g., by a programmer), as desired according to the visual effect being rendered.

In step 450, the decontaminated RGB component is adjusted, (e.g., by the processor 102 or the APD 116). That is, when removing the IR energy from the RGBIR image, dark areas are left in the image. If the image includes a large percentage of IR energy that is removed, this can lead to a very noticeable difference in the RGB component where the dark regions occur. Accordingly, the output decontaminated RGB image is compared against a pre-defined threshold, and if the value is less than the pre-defined threshold, a portion of the non-decontaminated RGB image is added back to the output RGB component to degrade the strength of decontamination in that portion. This threshold can also be increased or decreased according to the visual effect being rendered. On the other hand, in a highlighted or saturated area in the RGB image, if the observed RGB value is saturated, the decontamination function is not performed at all since it can be difficult to estimate the value of decontamination to remove the possible added energy by the IR contamination to get correct color. That is, the decontamination on such an area can result in false color.

Once the decontamination and adjustment steps are performed (steps 430 and 450), interpolation is performed on the adjusted RGB component (step 460) by the processor 102 or APD 116, to prepare the component for conventional processing by a conventional ISP. During interpolation, the IR components of the image that are removed get replaced with visible components, (e.g., R, G, B components). FIG. 5A shows an example RGBIR pattern 500. As shown in pattern 500, there are four 2×2 RGBIR patterns, each group including a group of B, G, IR, R components. One group is shown in the top left quadrant, one group in the top right quadrant, one group in the bottom left quadrant, and one group in the bottom right quadrant. During interpolation in step 460, each IR component removed during decontamination is replaced with a G component. Therefore, FIG. 5B shows an example interpolated Bayer pattern 500B with IR contamination removed. The decontaminated and adjusted IR Image, and the decontaminated, adjusted and interpolated RGB image are both then provided to the conventional ISP for further conventional processing.

Thus, as shown in FIG. 5B, a G component exists in each quadrant where the IR component has been removed. However, it should be noted that an example 2×2 Bayer pattern can include four possible layouts, "RGGB", "BGGR", "GRBG" or "GBRG". The example BGGR layout depicted in FIG. 5B is one example layout interpolating from that in FIG. 5A.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, graphics processor, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments. For example, the above methods can be implemented either in a hardware implementation of a system on chip (SoC), or in the programming of a GPU to compute normal RGB and IR images.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing processing in an image capturing device, comprising:

receiving an image at the image capturing device, wherein each pixel that comprises the image includes an infrared value and a visible value;

obtaining, by a first processor, a contamination matrix that defines relationships between ideal non-contaminated values and the infrared value and the visible value of each pixels;

generating, by the first processor, decontaminated infrared values and decontaminated visible values for each pixel by performing a decontamination process based on the contamination matrix;

performing, by the first processor, a RGB adjustment process on the decontaminated visible values, wherein the RGB adjustment process includes substituting one or more decontaminated visible values with corresponding visible values from the image when the one or more decontaminated visible values are less than a predetermined darkness threshold;

performing, by the first processor, an interpolation on the decontaminated visible values to generate an interpolated visible values; and providing, by the first processor, the decontaminated infrared values and the decontaminated interpolated visible values to an image signal processor (ISP) for further processing.

2. The method of claim 1 wherein the decontamination removes visible light energy from the received image.

3. The method of claim 2, further comprising performing, by the first processor, an adjustment on the decontaminated infrared component.

4. The method of claim 3 wherein if an energy value of the decontaminated infrared component is greater than a threshold, reducing the decontamination of the infrared component.

5. The method of claim 4 wherein the decontamination is reduced by adding a portion of the removed energy to the infrared component.

6. The method of claim 5 wherein the threshold is set based upon a desired visual effect to be rendered.

7. The method of claim 1 wherein the decontamination removes infrared energy from received image to generate the decontaminated visible component.

8. The method of claim 7 wherein the decontaminated visible component includes red, blue and green light components.

9. The method of claim 8, further comprising performing, by the first processor, an adjustment on the decontaminated visible component.

10. The method of claim 9 wherein if an energy value of the decontaminated visible component is less than a threshold, reducing the decontamination of the visible component.

11. The method of claim 10 wherein the decontamination is reduced by adding a portion of the removed energy to the visible component.

12. The method of claim 11 wherein the threshold is set based upon a desired visual effect to be rendered.

13. The method of claim 9 wherein if an energy value of the visible component is saturated, the decontamination of the visible component is not performed.

14. The method of claim 1 wherein the performing an interpolation includes replacing a removed infrared component with a visible component.

15. The method of claim 14 wherein the visible component includes a Bayer pattern of red (R), blue (B), or green (G) light components.

16. The method of claim 15 wherein the removed infrared (IR) component is replaced with one of a red (R), blue (B), or green (G) light component depending on which component of the Bayer pattern was occupied by the IR component in the received RGBIR pattern.

17. The method of claim 1, further comprising performing, by the first processor, a calibration to determine a contamination factor.

18. The method of claim 17, further comprising generating, by the first processor, a uniform test chart, which is a diffusor backlighted by narrow spectrum band light, capturing a series of raw images by the image capturing device for use on the test chart, and calculating the contamination factor for each of an R, G, B, and IR channel to form the contamination matrix for each pixel position.

19. An image capturing device, comprising:
a camera module;
a first processor operatively coupled to the camera module; and
an image signal processor (ISP) operatively coupled with the processor, wherein the camera module receives an image, wherein each pixel that comprises the image includes an infrared value and a visible value and forwards the received image to the processor, the first processor obtains a contamination matrix that defines relationships between ideal non-contaminated values and the infrared value and the visible value of each pixels, generates decontaminated infrared values and decontaminated visible values for each pixel by performing a decontamination process based on the contamination matrix, the first processor performs a RGB adjustment process on the decontaminated visible values, wherein the RGB adjustment process includes substituting one or more decontaminated visible values with corresponding visible values from the image when the one or more decontaminated visible values are less than a predetermined darkness threshold, the first processor performs an interpolation on the decontaminated visible values to generate an interpolated visible values, and forwards the decontaminated infrared values and the decontaminated interpolated visible values to the ISP for further processing.

20. The image capturing device of claim 19 wherein the decontamination removes visible light energy from received image.

21. The image capturing device of claim 20, further comprising the first processor performing an adjustment on the decontaminated infrared component.

22. The image capturing device of claim 21 wherein if an energy value of the decontaminated infrared component is greater than a threshold, reducing the decontamination of the infrared component.

23. The image capturing device of claim 22 wherein the decontamination is reduced by adding a portion of the removed energy to the infrared component.

24. The image capturing device of claim 23 wherein the threshold is set based upon a desired visual effect to be rendered.

25. The image capturing device of claim 19 wherein the decontamination removes infrared energy from received image to generate the decontaminated visible component.

26. The image capturing device of claim 25 wherein the decontaminated visible component includes red, blue and green light components.

27. The image capturing device of claim 26, further comprising the first processor performing an adjustment on the decontaminated visible component.

28. The image capturing device of claim 27 wherein if an energy value of the decontaminated visible component is less than a threshold, reducing the decontamination of the visible component.

29. The image capturing device of claim 28 wherein the decontamination is reduced by adding a portion of the removed energy to the visible component.

30. The image capturing device of claim 29 wherein the threshold is set based upon a desired visual effect to be rendered.

31. The image capturing device of claim 27 wherein if an energy value of the visible component is saturated, the decontamination of the visible component is not performed.

32. The image capturing device of claim 19 wherein the performing an interpolation includes replacing a removed infrared component with a visible component.

33. The image capturing device of claim 32 wherein the visible component includes a Bayer pattern including red (R), blue (B), and green (G) light components.

34. The image capturing device of claim 33 wherein the removed infrared (IR) component is replaced with one of a red (R), blue (B), or green (G) light component depending on which component of the Bayer pattern was occupied by the IR component in the received RGBIR pattern.

35. The image capturing device of claim 19, wherein the processor performs a calibration to determine a contamination factor.

36. The image capturing device of claim 35, wherein the processor generates a uniform test chart, which is a diffusor backlighted by narrow spectrum band light, captures a series of raw images for use on the test chart, and calculates the contamination factor for each of an R, G, B, and IR channel to form the contamination matrix for each pixel position.

37. A non-transitory computer readable medium having instructions recorded thereon, that when executed by a computing device, cause the computing device to perform operations including:

receiving an image, wherein each pixel that comprises the image includes an infrared value and a visible value;

obtaining, by a first processor, a contamination matrix that defines relationships between ideal non-contaminated values and the infrared value and the visible value of each pixels;

generating, by the first processor, decontaminated infrared values and decontaminated visible values for each pixel by performing a decontamination process based on the contamination matrix;

performing, by the first processor, a RGB adjustment process on the decontaminated visible values, wherein the RGB adjustment process includes substituting one or more decontaminated visible values with corresponding visible values from the image when the one or more decontaminated visible values are less than a predetermined darkness threshold;

performing, by the first processor, an interpolation on the decontaminated visible values to generate an interpolated visible values; and providing, by the first processor, the decontaminated infrared values and the decontaminated interpolated visible values to an image signal processor (ISP) for further processing.

* * * * *